United States Patent [19]
Sato

[11] Patent Number: 5,559,546
[45] Date of Patent: Sep. 24, 1996

[54] STENCIL PERFORATING METHOD, STENCIL PERFORATING SYSTEM, AND STENCIL PRINTING MACHINE

[75] Inventor: Mitsuo Sato, Shibata-machi, Japan

[73] Assignee: Tohoku Ricoh Co., Ltd., Miyagi, Japan

[21] Appl. No.: 291,549

[22] Filed: Aug. 16, 1994

[30] Foreign Application Priority Data

Dec. 17, 1993 [JP] Japan ................................. 5-318333
Jul. 8, 1994 [JP] Japan ................................. 6-157599

[51] Int. Cl.$^6$ ................................. B41J 2/335
[52] U.S. Cl. ................................. 347/200; 347/171
[58] Field of Search ................................. 101/121, 128.4, 101/129, 124, 128.21; 347/171, 206

[56] References Cited

U.S. PATENT DOCUMENTS

| | | | |
|---|---|---|---|
| 5,140,898 | 8/1992 | Igarashi | 101/128.4 |
| 5,224,419 | 7/1993 | Fukai | 101/128.4 |
| 5,355,793 | 10/1994 | Sato et al. | 101/129 |
| 5,384,585 | 1/1995 | Okumura | 101/129 |

FOREIGN PATENT DOCUMENTS

| | | |
|---|---|---|
| 2-67133 | 3/1990 | Japan. |
| 4-45936 | 2/1992 | Japan. |
| 5-220919 | 8/1993 | Japan. |
| 6-115042 | 4/1994 | Japan. |

*Primary Examiner*—Huan H. Tran
*Attorney, Agent, or Firm*—Oblon, Spivak, McClelland, Maier & Neustadt, P.C.

[57] ABSTRACT

A heat sensitive stencil is brought into contact with a thermal head having a plurality of heating resistors arranged in a row, is moved in a sub-scanning direction orthogonal to a direction in which the heating resistors are arranged, and is perforated in the dot matrix shape with selectively heated heating resistors. The heat sensitive stencil is made substantially only of a thermoplastic resin film. A width of a non-perforated portion of the heat sensitive stencil between two adjacent perforations is 20% or more of a pitch between two adjacent heating resistors in the main scanning direction.

4 Claims, 8 Drawing Sheets

STENCIL PERFORATING METHOD, STENCIL PERFORATING SYSTEM, AND STENCIL PRINTING MACHINE

BACKGROUND OF THE INVENTION

1. Field of the Invention

This invention relates to a method and an apparatus for perforating, on a heat sensitive film, a pattern in dot matrix form corresponding to an original image, by using a thermal head. The heat sensitive film is substantially made only of a thermoplastic resin film.

2. Description of the Related Art

A heat sensitive stencil perforating system is well-known. In such a system, a thermoplastic resin film of approximately 1.5 μm to 2 μm in thickness and a porous base support, such as Japanese paper, are bonded to form a heat sensitive stencil. A thermal head is used to perforate the stencil with a pattern of an original image in dot matrix form. For instance, Japanese Patent Laid-open Publication No. Hei 2-067,133 discloses a thermal head for use with the foregoing stencil perforating system, i.e. the thermal head has heating resistors whose pitch is shorter in a stencil feeding direction (i.e. a sub-scanning direction) than a pitch in a direction orthogonal to the stencil feeding direction (i.e. a main scanning direction). Further, Japanese Patent Laid-open Publication No. Hei 4-045,936 proposes a thermal head including heating resistors whose cross section is a shape other than rectangular.

Referring to FIG. 14 of the accompanying drawings, the stencil perforating system of the prior art uses a heat sensitive stencil 1 made of a thermoplastic resin film 1a and a porous base support 1b, both of which are bonded. The heat sensitive stencil 1 is conveyed to a space between a platen roller 3 and a thermal head 4, so that the thermophetic resin film 1a is directly perforated by heating resistors 5 of the thermal head 4.

The foregoing stencil perforating system is, however, prone to the following problems depending upon characteristics of the heat sensitive stencil. When fibers are sparse or coarse in the porous base support, the heat sensitive stencil cannot be brought into close contact with the heating resistors of the thermal head, which might result in erratic perforations or non-perforation of the stencil. Further, when the fibers are close in the base support, or when they are lumpy, the heat sensitive stencil is also subjected to erratic perforation. This is because heat applied by the thermal head is absorbed by the fibers, or melted remains of the heat sensitive film stick to the fibers. Further, when fibers in the base support are too thin, the thermoplastic resin film tends to stick closely to the heating resistors, which undesirably enlarges the perforations. As shown in FIG. 15, sometimes perforations 102 are not formed at positions where they should be, they tend to have different shapes or sizes, or they are so large that they link with adjacent perforations.

Therefore, when the foregoing stencils are used in the printing operation, they would produce images which have faded portions, images which have non-inked white spots in solid portions, images which are partially printed, or images which have non-inked white portions in the shape of fibers of the base support, or would cause ink on a previously printed sheet to be transferred to the back surface of the next printed sheet (called "back transfer").

Further, ink cannot pass through the stencil at portions where fibers are lumpy in the base support or where an amount of adhesive is excessive, so that such a stencil would also produce images similar to those described above.

To overcome the foregoing problems, it has been proposed to use a heat sensitive stencil made substantially only of a thermoplastic resin film of 1.5 μm to 2 μm in thickness without any base support such as Japanese paper. However, when such a heat sensitive stencil is perforated by a conventional stencil perforating system, a space c (FIG. 16) between two adjacent perforations 122 is too small, which would reduce the plate wear of the heat sensitive stencil 121.

The heat sensitive stencils made of substantially only a thermoplastic resin film are classified into a heat sensitive stencil containing only the thermoplastic resin film, a thermoplastic resin film containing a minute amount of an antistatic agent, and a thermoplastic resin film which has at least one overcoat layer at least on either a front or rear surface thereof.

For instance, when an original image 100 has a number of horizontal lines as shown in FIG. 17, a stencil 101 is accordingly perforated as shown in FIG. 18. FIG. 19 is an enlarged view of the horizontal line area B of the stencil 101 (shown in FIG. 18), and shows that perforations 102 are arranged orderly thereon. Then, the perforated stencil 101 is wound around an outer surface of a cylindrical printing drum 103 with the leading edge thereof held by a clamp 104. Thereafter, print sheets are successively pressed toward the printing drum 103 by a press roller so that the image perforated on the stencil 101 will be printed on the print sheets. In this state, the press roller applies tension to the stencil 101 in the direction X (FIG. 18). Therefore, the stencil 101 is accordingly stretched together with the perforations 102 thereon as shown in FIG. 20. This means that some printed horizontal lines will become unnecessarily thick. This phenomenon is often considerable in a horizontal line area B and a central area D as shown in FIG. 18.

Further, as the printing operation is repeated, the stencil 101 may become broken around an area C where the stencil was perforated to indicate a circle (shown in FIG. 18), and will be peeled off from the printing drum 103 at the area inside the circle. In FIG. 18, the printing drum 103 is shown in the expanded flat form.

SUMMARY OF THE INVENTION

It is, therefore, an object of the invention to provide a stencil perforating method, a stencil perforating system, and a stencil printing machine which can overcome the foregoing problems of the prior art. According to the invention, the stencil has sufficient plate wear, and assures printed images free from faded portions, non-printed white spots in solid portions, shadows of fibers, and back transfer.

In accordance with the invention, there is provided a method of perforating a heat sensitive stencil. In this method, the heat sensitive stencil is brought into contact with a thermal head having a plurality of heating resistors arranged in a row, is moved in a sub-scanning direction orthogonal to a direction in which the heating resistors are arranged, and is perforated in a dot matrix pattern by selectively heated heating resistors. The heat sensitive stencil is substantially made of a thermoplastic resin film. A width of a non-perforated portion between two adjacent perforations on the heat sensitive stencil is 20% or more of a pitch between two adjacent heating resistors in a main scanning direction.

The invention can better be understood by reference to the following description particularly when taken in conjunction with the attached drawings which show preferred embodiments.

DETAILED DESCRIPTION OF THE PREFERRED EMBODIMENTS

Figure 1:
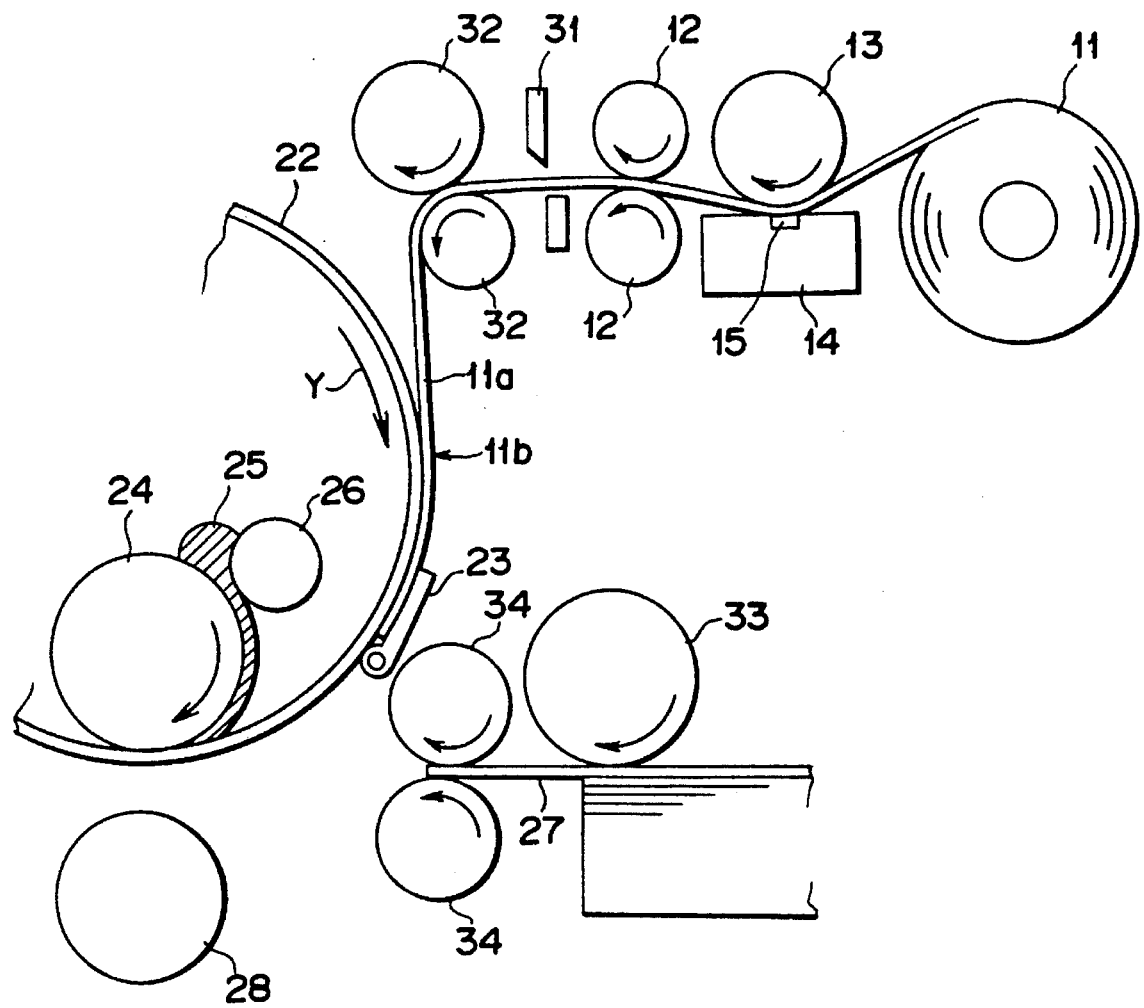
FIG. 1 is a sectional view showing a main part of a stencil perforating system according to a first embodiment of the invention.

The invention will be described hereinafter with reference to a first embodiment shown in the drawing figures.

Referring to FIG. 1, a heat sensitive stencil 11 (called "stencil" hereinafter) is made substantially only of a thermoplastic resin film such as a polyester film having a thickness of approximately 2 μm to 8 μm. The stencil 11 passes through a space between a platen roller 13 and a thermal head 14, thereby reaching a pair of feed rollers 12. The stencil 11 is stretched by the feed rollers 12 under a predetermined tension. In this state, the stencil 11 is brought into direct contact with a plurality of heating resistors 15 of the thermal head 14 by the platen roller 13, and is conveyed in the rotating direction of the platen roller 13. In the thermal head 14, the heating resistors 15 are in direct contact with the stencil 11. Selectively heated resistors 15 melt and perforate the stencil 11.

Figure 2:
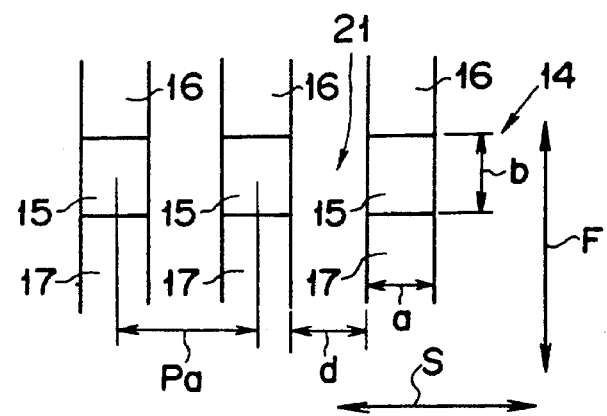
FIG. 2 is a plan view of main part of a thermal head.

As shown in FIG. 2, the heating resistors 15 have rectangular cross sections, and are arranged in a row with a predetermined pitch Pa in the main scanning direction S (i.e. transversely). Each heating resistor 15 is connected to a pair of electrodes 16 and 17 on opposite sides thereof in the sub-scanning direction F (i.e. the stencil feeding direction). The heating resistors 15 perforate the stencil 11 in the matrix shape.

Figure 3:
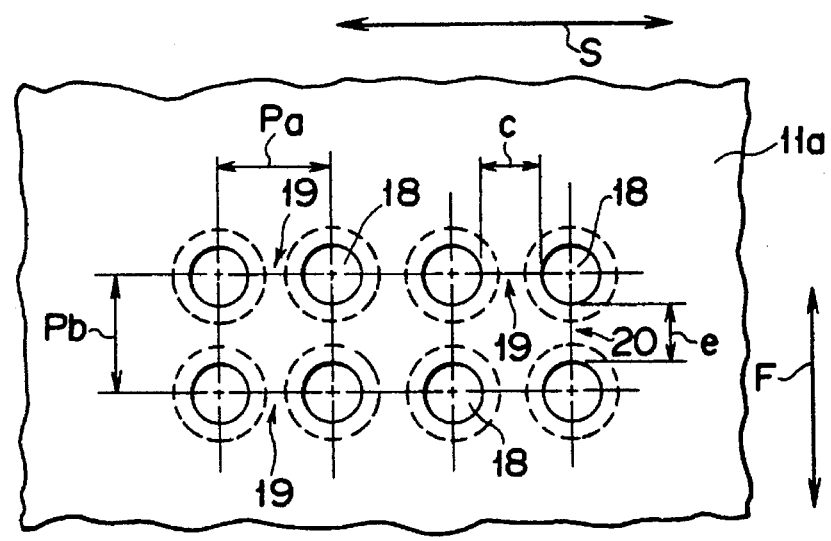
FIG. 3 is a plan view showing a main part of a stencil perforated by the thermal head shown in FIG. 2.

On the stencil 11, the perforations 18 in the matrix shape are formed with the pitches Pa and Pb corresponding to those of the heating resistors 15 in the main and sub-scanning directions S and F, respectively, as shown in FIG. 3. In this embodiment, the pitches Pa and Pb are the same.

When a width c of a non-perforated space 19 between two adjacent perforations 18 in the main scanning direction S is narrow as shown in FIG. 3, the stencil 11 becomes weak with respect to tension in the sub-scanning direction F and tends to have reduced its plate wear. Conversely, when the width c is too large, a printed sheet is prone to have faded portions or non-inked white spots since there are many areas preventing permeation of ink.

Therefore, it is preferable that the width c of the non-perforated space 19 between the two adjacent perforations should be set between 20% and 50%, preferably between 20% and 40%, of the pitch Pa in the main scanning direction S.

Further, a width e of a non-perforated space 20 between two adjacent perforations 18 in the sub-scanning direction F is between 20% and 50%, preferably between 20% and 40%, of the pitch Pb in the sub-scanning direction.

To maintain the predetermined width c of the non-perforated space 19 of the stencil 11 in the main scanning direction S, a width d of a space 21 between two adjacent heating resistors 15 in the main scanning direction is between 30% and 65%, preferably between 45% and 65%, of the pitch Pa in the main scanning direction S.

Figure 4:
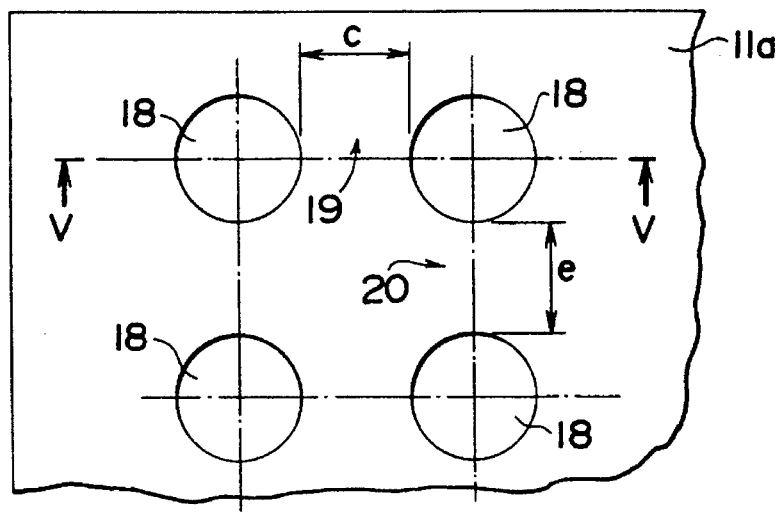
FIG. 4 is plan view of another perforated stencil.
Figure 5:
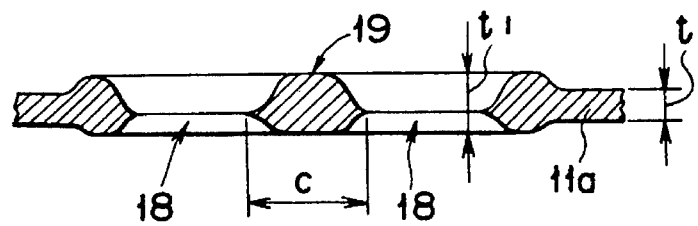
FIG. 5 is a sectional view of the perforated stencil taken along line V—V in FIG. 4.

Referring to FIG. 4, perforations 18 are formed on the stencil 11 with the widths c and e kept in the foregoing ranges. As shown in FIG. 5 on an enlarged scale, a thickness $t_1$ of the non-perforated space 19 between the perforations 18 is increased compared with an original thickness t of the stencil 11. Therefore, the non-perforated spaces 19 and 20 between the two adjacent perforations 18 in the main and sub-scanning directions become stronger than they look. The thickness $t_1$ of the non-perforated spaces 19 and 20 becomes approximately twice as large as the original thickness t of the stencil 11 after it is heated, melted and shrunk. Thus, the perforated stencil 11 becomes stronger in the main and sub-scanning directions, and has improved plate wear.

When the stencil 11 is heated and melted to have perforations 18 formed, resin in the stencil 11 is not evaporated, but is attracted and raised around the perforations 18. Therefore, the stencil 11 becomes thicker at the non-perforated spaces 19 and 20, and has improved plate wear.

Figure 6:
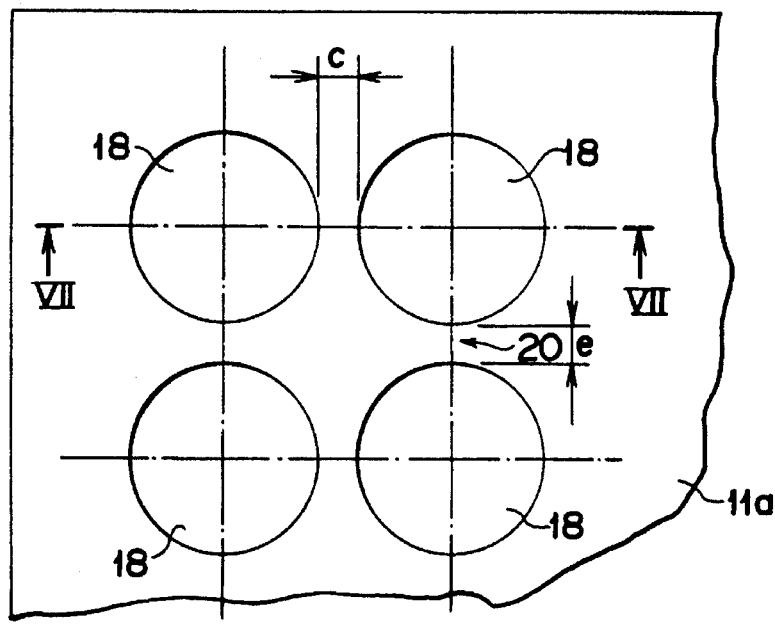
FIG. 6 is a top plan view of still another perforated stencil.
Figure 7:
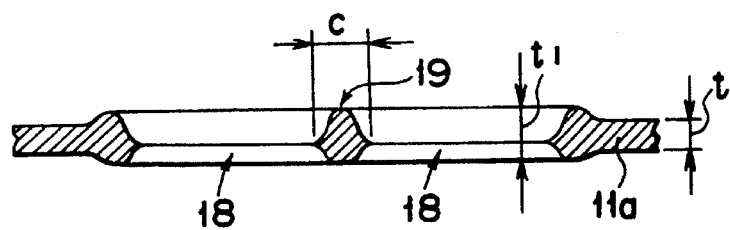
FIG. 7 is a sectional view of the perforated stencil taken along line VII—VII in FIG. 6.

Referring to FIG. 6, another stencil 11 is perforated in such a manner that the widths c and e between the perforations 18 deviate from the foregoing ranges. FIG. 7 is an enlarged sectional view of such a stencil 11. As can be seen in FIG. 7, the non-perforated space 19 does not have a sufficient sectional area and becomes smaller, so that it would be easily stretched by the tension applied to the stencil 11 in the main scanning direction.

Returning back to FIG. 1, the perforated stencil 11 (hereinafter assigned reference numeral 11a) is wound around an outer surface of a printing drum 22 with the leading edge thereof held by a clamp 23. The printing drum 22 houses an ink supply roller 24 for supplying ink to an inner surface of the printing drum 22, and a doctor roller 26 which is in parallel to the ink roller 24 with a minute space kept therebetween and forms an ink pool 25 with the ink roller 24.

Referring to FIG. 1, a cutter 31 is used to cut the stencil 11 to a preset length, and a pair of rollers 32 serve to feed the stencil 11 toward the clamp 23, and apply predetermined tension to the stencil 11a wound around the printing drum 22.

After being wound around the printing drum 22, the stencil 11a is subjected to the printing process. First of all, a feed roller 33 feeds a print sheet 27 into a space between a pair of register rollers 34. The print sheet 27 is guided into a space between the outer surface of the printing drum 22 and a press roller 28. Thereafter, the press roller 28 which is positioned away from the printing drum 22 moves upward so as to press the print sheet 27 toward the printing drum 22 via the perforated stencil 11a. Thus, ink is transferred onto the print sheet 27 via the perforated stencil 11a, thereby printing the image on the print sheet 27.

During the printing process, the ink roller 24 also rotates in the same direction as the printing drum 22, thereby supplying ink to the inner surface of the printing drum 22.

The printed sheet 27 is peeled off from the printing drum 22 by a sheet separating claw (not shown), and is discharged onto a tray (not shown), at which stage, the first sheet has been printed. This first printing operation is called a "stencil sticking process". Thereafter, the printing process will be repeated so as to produce a desired number of printed sheets.

In the printing process, the perforated stencil 11a is pulled in a direction so as to be freed from the clamp 23 since the printing drum 22 is turned in the direction Y at a high speed. Since the width c of each non-perforated space between two adjacent perforations is between 20% and 50% of the pitch Pa in the main scanning direction, and since the width e of each non-perforated space between two adjacent perforations is between 20% and 50% of the pitch Pb in the sub-scanning direction, the non-perforated spaces 19 and 20 in the main and sub-scanning directions are not stretched, thereby always allowing the perforations 18 to be discrete.

The following describes a comparison between a stencil perforated and used in the printing operation according to the first embodiment of the invention, and a stencil perforated and used in the printing operation according to a conventional method.

Example according to Embodiment 1

A heat sensitive stencil was perforated by a heat sensitive stencil digital printer (Preport, trade name, including a thermal head of 400 dots/inch and manufactured by Ricoh Company, Ltd.) under the following conditions. An original image had a number of horizontal lines. The perforated stencil was subject to continuous printing at a speed of 120 sheets/minute.

Width d of the space between the two adjacent heating resistors in the main scanning direction: 33.5 μm Width a of the heating resistor in the main scanning direction: 30 μm Length b of the heating resistor in the sub-scanning direction: 40 μm Pitch Pa between the two adjacent heating resistors in the main scanning direction: 63.5 μm Pitch Pb between the two adjacent heating resistors in the sub-scanning direction: 63.5 μm Thickness of the heat sensitive stencil (comprising only a polyester film): 2 μm Applied power: 0.09 W On the stencil, the perforations were completely discrete. The width c of the space between the two adjacent heating resistors in the main scanning direction is between 15 μm and 20 μm, which corresponds to 24% to 31% of the pitch Pa in the main scanning direction. The width d corresponds to 24% to 31% of the pitch Pb in the sub-scanning direction.

The perforated stencil was wound around the printing drum and used to print 3,000 sheets. The printed sheets were found to be substantially free from thickened horizontal lines. The perforated stencil was confirmed to have a sufficient plate wear. However, it was found that when the width c exceeded 50% of the pitch Pa in the main scanning direction, solid portions of printed sheets became somewhat faded in spite of the permeation of ink to such portions.

Comparative Example

A heat sensitive stencil was perforated by the heat sensitive stencil digital printer (Preport, trade name, including a thermal head of 400 dots/inch and manufactured by Ricoh Company, Ltd.) under the following conditions. An original image had a number of horizontal lines. The perforated stencil was subject to continuous printing at a speed of 120 sheets/minute.

Width d of the space between the two adjacent heating resistors in the main scanning direction: 13.5 μm Width a of the heating resistor in the main scanning direction: 50 μm Length b of the heating resistor in the sub-scanning direction: 60 μm Pitch Pa between the two adjacent heating resistors in the main scanning direction: 63.5 μm Pitch Pb between the two adjacent heating resistors in the sub-scanning direction: 63.5 μm Thickness of the heat sensitive stencil (comprising only a polyester film): 2 μm Applied power: 0.16 W On the stencil, the perforations were completely discrete. However, the width c between two adjacent perforations in the main scanning direction was 5 μm to 10 μm, and corresponded to 16% or less of the pitch Pa in the main scanning direction.

The perforated stencil was wound around the printing drum and was used to print sheets. After printing approximately 500 sheets, printed horizontal lines became thicker near a center portion of leading edges thereof. The stencil was found to have a reduced plate wear.

Table 1 shows the results of the foregoing comparison.

TABLE 1

| | Main scanning direction | | | Ratio with Pa | | Width C of non-per-rated space | Plate wear |
|---|---|---|---|---|---|---|---|
| | Heating resistor | Space between 2 adjacent perforations | Pitch between 2 adacjent perforations | Heating resistor | Space between 2 adjacent heating resistors | | |
| Example 1 | a = 30 μm | d = 33.5 μm | Pa = Pb | 47% | 53% | 24–31% of Pa | 3,000 |
| Comparative Example 1 | a = 50 μm | d = 13.5 μm | 63.5 μm | 79% | 21% | 16% or less of Pa | 500 |

In the first embodiment of the present invention, the width c of the non-perforated space 19 between the two adjacent perforations in the main scanning directions is 20% or more of the pitch Pa of the two adjacent heating resistors in the main scanning direction S, so that the stencil has a sufficient plate wear. The printed sheets were found to be substantially free from images having faded portions, white non-inked white spots in solid portions, white spots at printed portions other than the solid portions, shadows of fibers, and back transfer.

Now, the invention will be described with reference to a second embodiment.

The inventor perforated, using a thermal head, a heat sensitive stencil composed only of a thermoplastic resin film of 3.5 μm or 4 μm in thickness. After observing the perforations, he performed experiments by printing sheets with the perforated stencil. When the stencil of 3.5 μm or more in thickness was used, the perforations formed thereon were found to be different from the perforations formed on the stencil of 1.5 μm to 2 μm in thickness.

Figure 11:
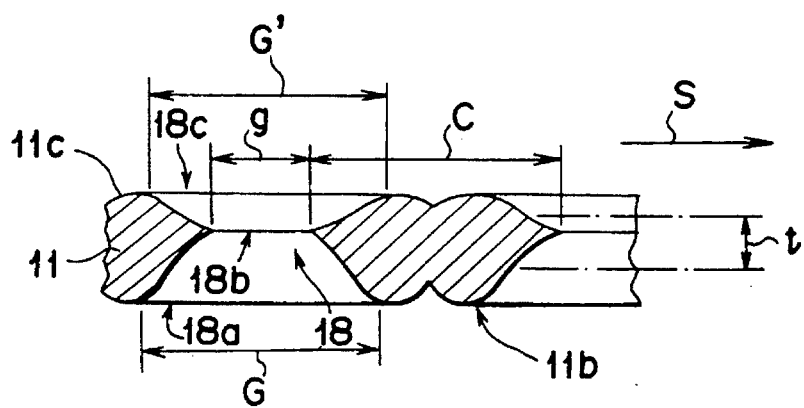
FIG. 11 is a view similar to FIGS. 9 and 10 but showing a perforation on a heat sensitive stencil of 3.5 μm or more in thickness.

When the stencil is 3.5 μm or more thick, raised edges surrounding perforations are very large compared with the raised edges around the perforations on the heat sensitive stencil having the thickness of 1.5 μm to 2 μm. Referring to FIG. 11, the perforation 18 is shaped like a bowl, i.e. wider at the opening and narrower toward the bottom thereof. As shown in FIG. 11, the perforation 18 is divided into large, middle and small portions 18a, 18b and 18c. The large portion 18a is on a surface 11b of the stencil 11 which is in direct contact with the thermal head, and has a diameter G. The middle portion 18b actually corresponds to the diameter of the heating resistor 15, and has a diameter g. The small portion 18c (with respect to the large portion 18a) is present on the other surface 11c of the stencil 11, is not in direct contact with the thermal head 14, and has a diameter G'. The original thickness of the stencil is represented by the letter t.

This stencil 11 is used to perform the printing process. Although the diameter g of the middle portion 18b is very small but the width c of a space between two adjacent perforations is large, printed sheets are found to be acceptable with solid portions inked properly.

The foregoing phenomenon occurs for the following reason. When ink 37 is applied on the stencil 11 during the printing process as shown in FIG. 12 and then the stencil 11 is brought into contact with a print sheet 27, ink 37 is transferred onto the print sheet 27 via the large portion 18a of the perforation 18.

Therefore, so long as the large portion 18a has the large diameter G, solid portions of a printed image are free from non-inked white spots, even if the middle portion 18b has the small diameter g.

Figure 12:
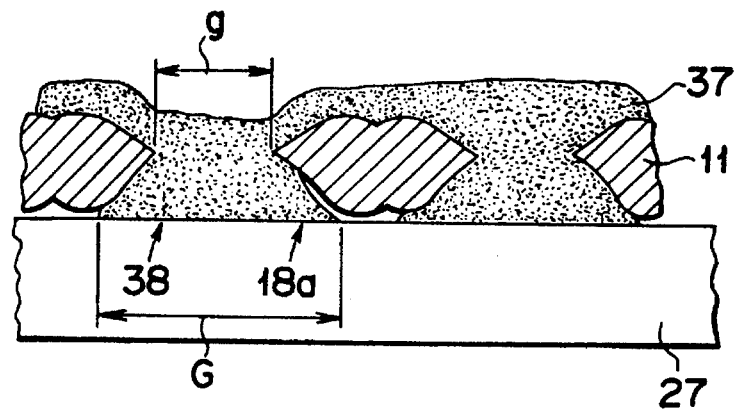
FIG. 12 shows how ink is transferred onto a print sheet via the perforated stencil of FIG. 11.
Figure 13:
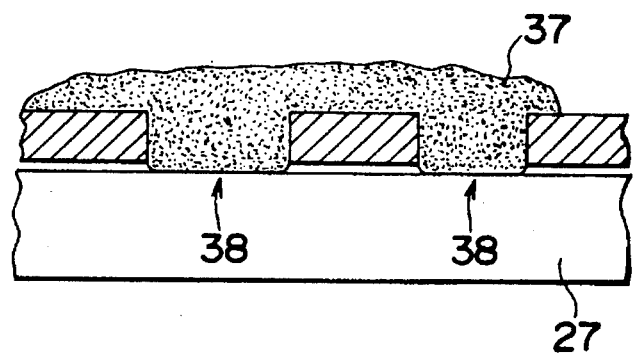
FIG. 13 is a view similar to FIG. 12 but showing that perforations are formed in the simple shape on a stencil.
Figure 14:
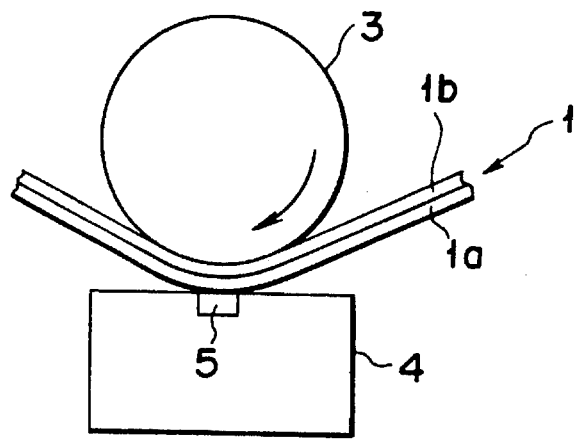
FIG. 14 is a sectional view showing a main part of a stencil perforating system of the prior art.
Figure 15:
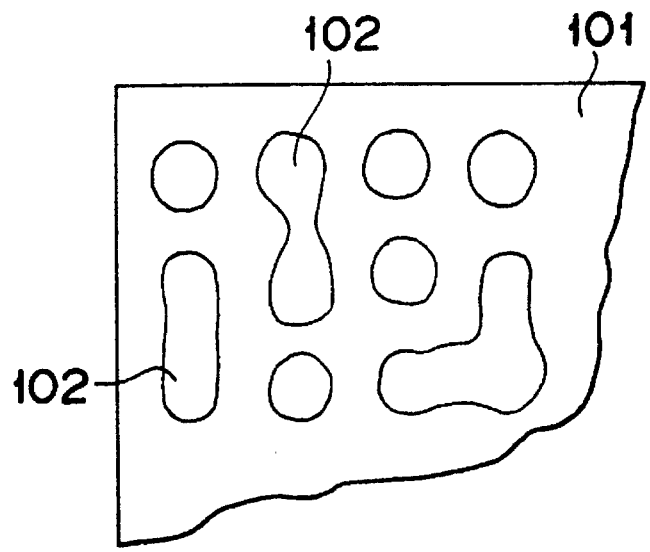
FIG. 15 is an enlarged plan view of a main part of a stencil prepared in the conventional stencil perforating system.
Figure 16:
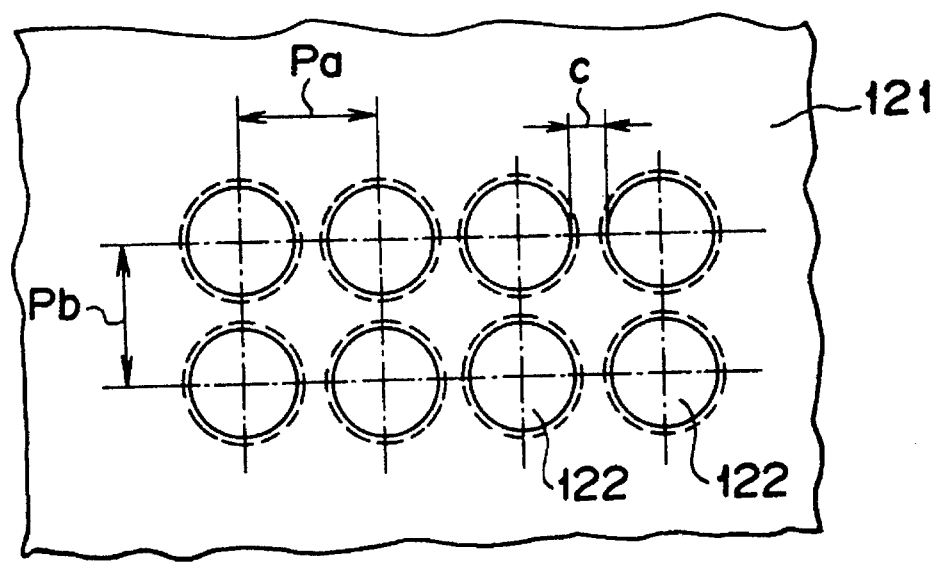
FIG. 16 is an enlarged plan view showing a main part of a stencil, which is made of only a thermoplastic resin film and has a thickness of 1.5 μm to 2 μm, prepared by the conventional stencil perforating system.
Figure 17:
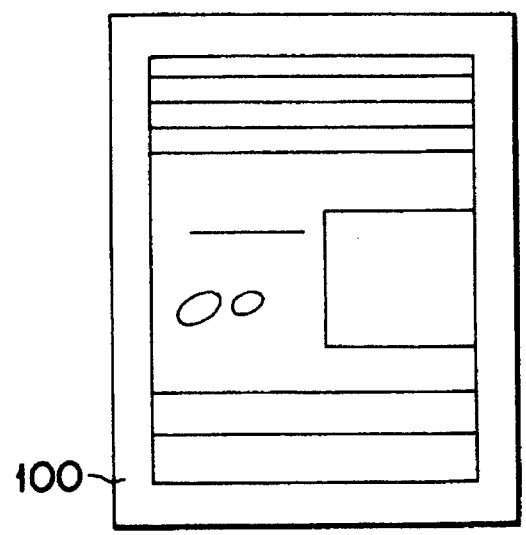
FIG. 17 shows an original image.
Figure 18:
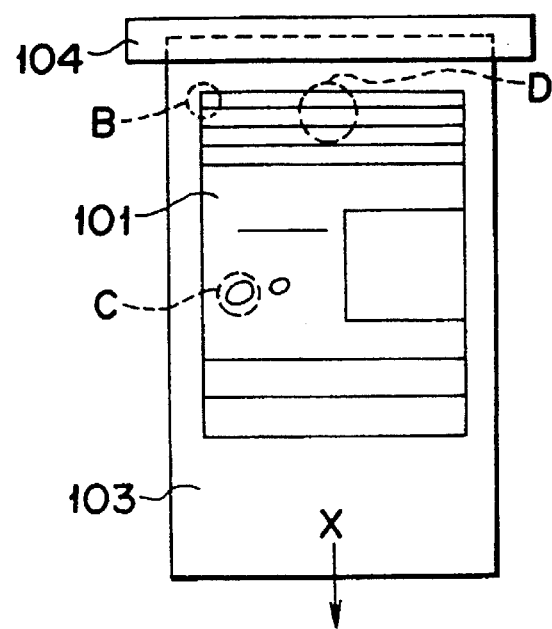
FIG. 18 shows a stencil which is perforated in accordance with the original image.
Figure 19:
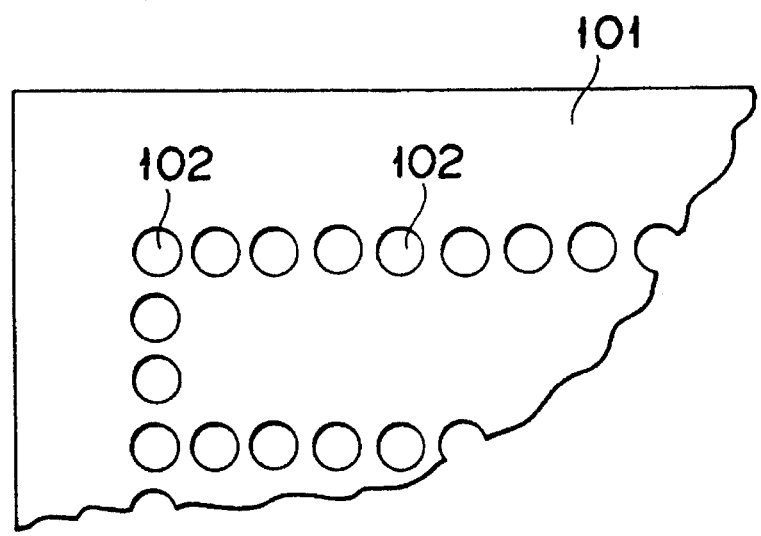
FIG. 19 is an enlarged plan view of a main part of the stencil of FIG. 18.
Figure 20:
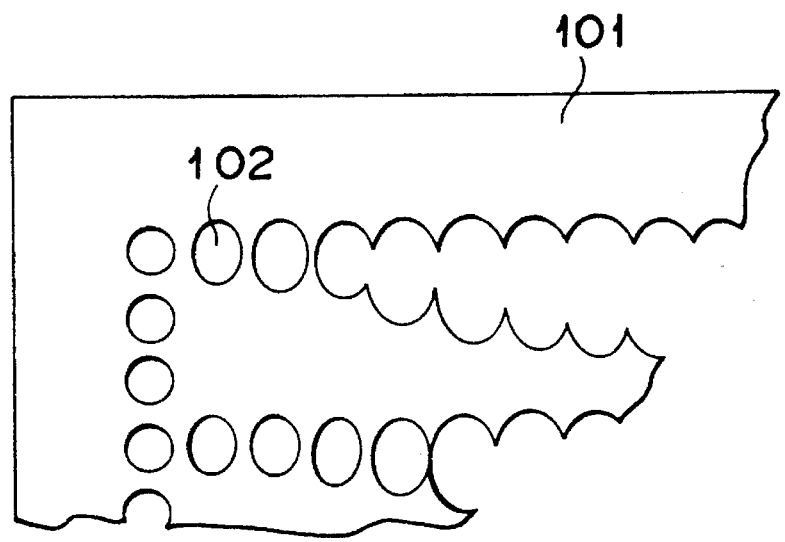
FIG. 20 is an enlarged plan view showing a main part of a stencil prepared by the conventional stencil perforating system and used for printing.

Referring to FIGS. 12 and 13, it is assumed that the print sheet has a smooth surface. It can be seen that a size of each of the ink dots 38 depends upon the diameter G of the large portion 18a of the perforation 18 but not upon the diameter g of the middle portion 18b.

FIG. 13 shows that the stencil has perforations 18 with a simple shape.

From the foregoing, it can be understood that even when the diameter g of the middle portion 18b is small, the diameter G of the large portion 18a which is equal to or more than the predetermined value is sufficient to make a perforated stencil strong with a reduced amount of energy applied thereto, and to produce printed images with clear solid portions.

When the perforations on the stencil have different sizes in the main and sub-scanning directions, the width of a perforation in the main scanning direction is considered to be the diameter of the perforation.

Through the use of the stencil 11 made of a thermoplastic resin film of 3.5 μm or more in thickness, it is possible to produce printed images without faded portions or non-inked white spots even when the non-perforated space (having the width c) between two adjacent perforations is 40% to 60% of the pitch Pa in the main scanning direction but the diameter G of the large portion 18a of the perforation is large enough.

With the foregoing stencil 11, the raised edges around the perforations become two or three times as thick as the original thickness of the stencil, which remarkably strengthens the non-perforated space (having the width c) compared with the non-perforated space of the stencil having a thickness of 1.5 μm to 2 μm.

In actual fact, only in view of the strength of the heat sensitive stencil, the diameter g of the middle portion 18b of the perforation 18 may be approximately 70% of the pitch Pa in the main scanning direction so long as the stencil has the thickness of 3.5 μm or more.

Conversely, when it is intended to make a perforation having the diameter g at the middle portion 18b which is approximately 70% of the pitch Pa in the main scanning direction, high energy should be applied to the thermal head 14, which would reduce the effective life of the thermal head 14 or a stencil perforating speed (i.e. increases the time necessary for the stencil perforation).

The heat sensitive stencil having the thickness or 3.5 μm or 4 μm inevitably requires more energy for the thermal head to perform perforation than the heat sensitive stencil of 1.5 μm to 2 μm in thickness. This results in a reduction in the life of the thermal head and reduction in the stencil perforating speed as described above. Therefore, it is difficult to perforate the middle portion 18b having a large diameter g when the heat sensitive stencil has the thickness of 3.5 μm or 4 μm.

On the basis of results of various experiments, the inventor noted the following. So long as the diameter G of the large portion 18a of the perforation 18 is 70% or more of the pitch Pa in the main scanning direction while the diameter g of the middle portion 18b is approximately 40% to 60% of the pitch Pa, it is possible to produce printed images without non-inked white spots on the solid portions by making use of the permeation of ink even when ink having an excellent penetration is not used.

Referring back to FIG. 11, it is noted that the raised edges around the perforation 18 on the surface 11b (in contact with the thermal head 14) are larger than those on the other surface 11c. In other words, the diameter G of the large portion 18a is larger than the diameter G' of the small portion 18c (which is not in contact with the thermal head 14). Therefore, the stencil 11 should be brought into contact with the print sheet 27 via the surface 11b thereof during the printing process.

It does not seem to matter whether the perforated stencil 11 is wound around the printing drum with the surface 11b or 11c in contact therewith. However, for the foregoing reason, the stencil 11 should be wrapped around the printing drum with the surface 11b facing outward. The stencil 11 has the large portion 18a on the surface 11b, which was brought into contact with the thermal head 14. This is one of the features of the present invention.

Figure 8:
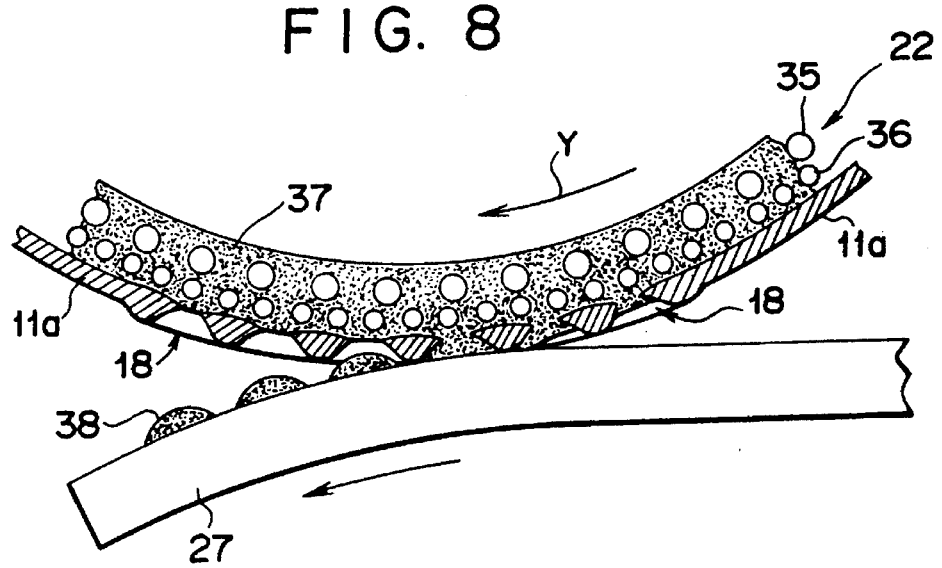
FIG. 8 schematically shows how ink is transferred to a print sheet in a stencil printing machine according to a second embodiment of the invention.

Referring to FIG. 8, the stencil 11 is perforated by controlling energy applied to the thermal head 14 (shown in FIG. 1) so as to obtain a stencil 11a having the diameter g of the middle portion 18b corresponding to 40% to 60% of the pitch Pa and the diameter G of the large portion 18a corresponding to 70% or more of the pitch Pa. The perforated stencil 11a is wound around the printing drum 22, and is used for the printing process as described with respect to the first embodiment.

During the printing process, ink is transferred onto the print sheet 27 via the perforations 18 of the stencil 11a on the printing drum 22 as shown in FIGS. 8 and 12. In this state, passing immediately through the perforations 18, ink spreads along the raised edges around the perforations 18 because of inner and osmotic pressures thereof, thereby depositing, on the print sheet 27, ink 37 in the shape of dots 38 having a diameter corresponding to the diameter G of the middle portion 18b of the perforation 18.

Thereafter, the first printed sheet 27 is peeled off from the printing drum 22 by a sheet separating claw (not shown), and is delivered onto a discharge tray (not shown). Thus, the stencil sticking process is completed.

Referring to FIG. 8, the deposited ink dots 38 spread due to the permeation of ink 37, thereby forming solid portions on the print sheet 27.

In FIG. 8, reference numerals 35 and 36 denote screen meshes which constitute a part of the printing drum 22, and hold and pass ink 37. The screen mesh 36 is an outermost member on the printing drum 22, and is in direct contact with the perforated stencil 11a.

An example of the second embodiment is described with reference to comparative examples.

Example A of the second embodiment

A heat sensitive stencil made only of a thermoplastic resin film was perforated by a heat sensitive stencil printing machine including a 400 dots/inch thermal head (Preport, trade name, manufactured by Ricoh Company, Ltd.) and was used for printing with the same machine. The following conditions were applied.

Width a of the heating resistor in the main scanning direction: 30 μm

Length b of the heating resistor in the sub-scanning direction: 40 μm

Pitch Pa between the two adjacent heating resistors in the main scanning direction: 63.5 μm Pitch Pb between the two adjacent heating resistors in the sub-scanning direction: 63.5 μm Thicknesses of the heat sensitive stencil (comprising only a thermoplastic resin film): 3.5 μm and 4.0 μm Applied energy: 50 μJ Although the diameter g of the middle portion 18b of the perforation 18 is small (50% or less of the pitch Pa of the two adjacent heating resistors in the main scanning direction), an image density is approximately 1.1 which is sufficiently good. This is because the diameter G of the large portion 18a is large.

Comparative Example A

To compare with the foregoing example A, a heat sensitive stencil made only of a thermoplastic resin film was perforated by a heat sensitive stencil digital printer including a 400 dots/inch thermal head (Preport, trade name, manufactured by Ricoh Company, Ltd.) and was used for printing with the same machine. The following conditions were applied.

Width a of the heating resistor in the main scanning direction: 30 μm

Length b of the heating resistor in the sub-scanning direction: 40 μm

Pitch Pa between the two adjacent heating resistors in the main scanning direction: 63.5 μm Pitch Pb between the two adjacent heating resistors in the sub-scanning direction: 63.5 μm Thicknesses of the heat sensitive stencil (comprising only a thermoplastic resin film): 3.5 μm and 4.0 μm Applied energy: 35 μJ Printed images have an image density of approximately 0.9.

Comparative Example B

To compare with the foregoing example A, a heat sensitive stencil made only of a thermoplastic resin film was perforated by a heat sensitive stencil printing machine including a 400 dots/inch thermal head (Preport, trade name, manufactured by Ricoh Company, Ltd.) and was used for printing with the same machine. The following conditions were applied.

Width a of the heating resistor in the main scanning direction: 30 μm

Length b of the heating resistor in the sub-scanning direction: 40 μm

Pitch Pa between the two adjacent heating resistors in the main scanning direction: 63.5 μm Pitch Pb between the two adjacent heating resistors in the sub-scanning direction: 63.5 μm Thicknesses of the heat sensitive stencil (comprising only a thermoplastic resin film): 3.5 μm and 4.0 μm Applied energy: 25 μJ In this example, printed sheets have an image density of approximately 0.7 to 0.9.

Table 2 shows the comparison of the examples.

TABLE 2

|  | Example A of present invention | Comparative Examples A | B |
|---|---|---|---|
| Thickness of stencil | 3.5 μm, 4 μm | 4 μm | 2 μm |
| Size of heating resistor — Main scanning direction | 30 μm | 30 μm | 30 μm |
| Size of heating resistor — Sub-scanning direction | 40 μm | 40 μm | 40 μm |
| Pitch Pa in main scanning direction | 63.5 μm | 63.5 μm | 63.5 μm |
| Pitch Pb in sub-scanning direction | 63.5 μm | 63.5 μm | 63.5 μm |
| Energy applied by thermal head | 50 μJ | 35 μJ | 25 μJ |
| Diameter g of small diameter portion 18b | 20–30 μm | 0–25 μm | 10–30 μm |
| g/Pa | 39–46% | 0–39% | 15–46% |
| Diameter G of large diameter portion 18a | Approx. 50 μm | Approx. 40 μm | Approx. 30 μm |
| G/Pa | 77% | 62% | 46% |
| Density of printed solid portion | Approx. 1.1 | Approx. 0.9 | Approx. 0.7–0.9 |

Figure 9:
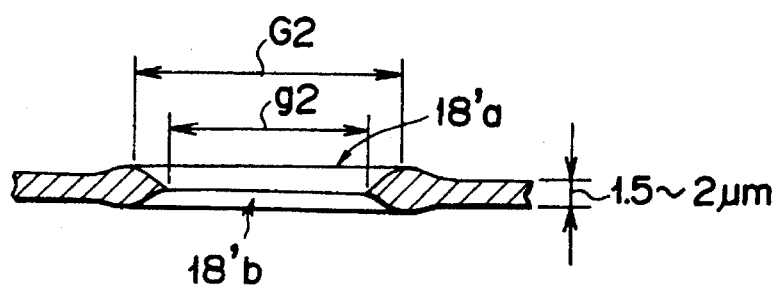
FIG. 9 is a sectional view of a perforation on a heat sensitive stencil of 1.5 μm–2 μm in thickness.
Figure 10:
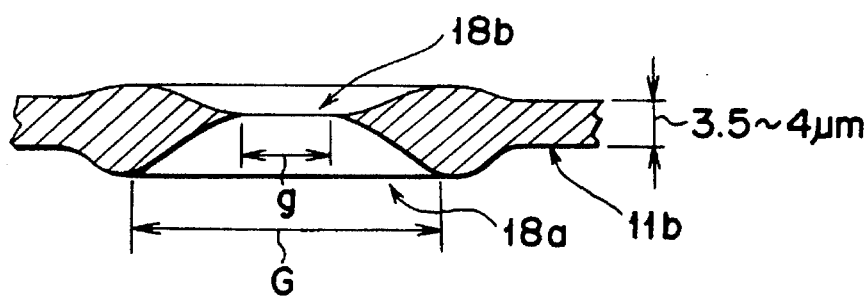
FIG. 10 is a view similar to FIG. 9 but showing a perforation on a heat sensitive stencil of 3.5 μm–4 μm in thickness.

When the heat sensitive stencil has the thickness of approximately 1.5 μm to 2 μm as shown in FIG. 9, a diameter g2 of a middle portion 18'b of the perforation 18 is substantially the same as the diameter G2 of a large portion 18'a. Therefore, it cannot be considered that the ink dots are enlarged due to the diameter G2.

Conversely, when the heat sensitive stencil used is 3.5 μm or 4 μm thick, the diameter G of the large portion 18a of the perforation 18 is remarkably large compared with the diameter g of the middle portion 18b. Therefore, even when the thermal head 14 applies a middle amount of energy and the diameter g of the small portion 18b is small, good printed images can be produced so long as the diameter G is sufficiently large.

A heat sensitive stencil comprising only a thermoplastic resin film of 3.5 μm or 4 μm in thickness was perforated under the following conditions. A thermal head had heating resistors, each of which was 30 μm wide and 40 μm long in the main and sub-scanning directions, respectively. Energy applied to the thermal head was controlled so as to form on the stencil perforations whose diameter g of the middle portion was approximately 40% to 50% of the pitch Pa of the heating resistors in the main scanning direction. Then, raised edges surrounding crater-shaped perforations 18 were formed. It is confirmed that the diameter G of the large portion 18a can be 70% or more of the pitch Pa of the heating resistors in the main scanning direction.

On the basis of the results of the foregoing experiments and other experiments, it was confirmed that good prints can be obtained when the heat sensitive stencil made only of a thermoplastic resin film with the thickness of 3.5 μm or more is used and perforated under the following conditions. The width of the heating resistor in the main scanning direction is approximately 35% to 70%, more preferably 35% to 55%, of the pitch Pa in the main scanning direction, and the length of the heating resistor in the sub-scanning direction is approximately 60% to 79% of the pitch Pb of the heating resistor in the sub-scanning direction.

It is possible to obtain a heat sensitive stencil having excellent plate wear and offering images without faded portions or non-inked white spots when the diameter g of the middle portion 18b of the perforation 18 in the main scanning direction is 50% or less of the pitch Pa of the heating resistor 15 in the main scanning direction, and the diameter G of the large portion 18a of the perforation 18 in the main scanning direction is 70% or more of the pitch Pa of the heating resistor 15 in the main scanning direction.

What is claimed is:

1. A method of perforating a heat sensitive stencil, the method comprising the steps of:

bringing the heat sensitive stencil into contact with a thermal head having a plurality of heating resistors arranged in a row;

moving the heat sensitive stencil in a sub-scanning direction which is orthogonal to a main-scanning direction in which the plurality of heating resistors are arranged; and perforating the heat sensitive stencil in a dot matrix shape with selectively heated heating resistors of said plurality of heating resistors;

the method comprising the further steps of:
making the heat sensitive stencil of substantially only a thermoplastic resin film; and
making a width of a space between two adjacent heating resistors of said plurality of heating resistors in the main scanning direction 30% or more of a pitch between the two adjacent heating resistors in the main scanning direction so as to regulate a width of a non-perforated portion of the heat sensitive stencil between two adjacent perforations in the main scanning direction to be 20% or more of the pitch between the two adjacent heating resistors in the main-scanning direction.

2. A stencil perforating system for perforating a heat sensitive stencil in a dot matrix shape, the stencil perforating system comprising:

means for bringing the heat sensitive stencil into contact with a thermal head having a plurality of heating resistors arranged in a row;

means for moving the stencil in a sub-scanning direction orthogonal to a main-scanning direction in which the plurality of heating resistors are arranged; and means for selectively heating resistors of said plurality of heating resistors so as to perforate the heat sensitive stencil in a dot matrix shape;

wherein:
the heat sensitive stencil is made substantially only of a thermoplastic resin film, and, in the thermal head, a space between two adjacent heating resistors of said plurality of heating resistors in the main-scanning direction is 30% or more of a pitch between two adjacent heating resistors of said plurality of heating resistors in the main-scanning direction, for regulating a width of a non-perforated portion of the heat sensitive stencil between two adjacent perforations in the main scanning direction to be 20% or more of the pitch between the two adjacent heating resistors.

3. A method of perforating a heat sensitive stencil, the method comprising the steps of:

bringing the heat sensitive stencil into contact with a thermal head having a plurality of heating resistors arranged in a row;

moving the heat sensitive stencil in a sub-scanning direction orthogonal to a main-scanning direction in which the plurality of heating resistors are arranged; and perforating the heat sensitive stencil in a dot matrix shape with selectively heated heating resistors of said plurality of heating resistors;

the method comprising the further step of:

making the heat sensitive stencil of substantially a thermoplastic resin film having a thickness of 3.5 μm or more;

wherein each perforation on the heat sensitive stencil of substantially a thermoplastic resin film having a thickness of 3.5 μm or more will be formed in a shape of a bowl which includes large and small diameter portions, such that the large diameter portion is present on a surface of the stencil in contact with the thermal head, the small diameter portion has a first diameter which is 50% or less of a pitch of two adjacent heating resistors of said plurality of heating resistors in the main-scanning direction, and the large diameter portion has a diameter which is 70% or more of the pitch of two adjacent heating resistors of said plurality of heating resistors in the main-scanning direction.

4. A stencil printing method comprising the steps of:

bringing a heat sensitive stencil into contact with a thermal head having a plurality of heating resistors arranged in a row;

moving the heat sensitive stencil in a sub-scanning direction orthogonal to a main-scanning direction in which the plurality of heating resistors are arranged;

perforating the heat sensitive stencil in a dot matrix shape with selectively heated heating resistors of said plurality of heating resistors, such that each perforation on the heat sensitive stencil is formed in the shape of a bowl which includes large and small diameter portions;

regulating a width of a non-perforated portion of the stencil between adjacent perforations in the main scanning direction; and winding the perforated stencil around a printing drum so as to perform printing, wherein the regulated width of the non-perforated portion of the stencil prevents a stretching of the stencil when the stencil is wound on the printing drum;

the method comprising the further steps of:

making the heat sensitive stencil of substantially a thermoplastic resin film having a thickness of 3.5 μm or more; and the winding step comprising the further step of:

winding the perforated stencil around the printing drum with a surface having the large diameter portion of the bowl-shaped perforations thereof being brought into contact with the thermal head facing outward.

* * * * *

UNITED STATES PATENT AND TRADEMARK OFFICE
CERTIFICATE OF CORRECTION

PATENT NO. : 5,559,546
DATED : September 24, 1996
INVENTOR(S) : MITSUO SATO

It is certified that error appears in the above-indentified patent and that said Letters Patent is hereby corrected as shown below:

In column 1, line 36, change "thermophetic" to --thermoplastic--.

Columns 7 & 8, lines 1-10:

In Table 1, change "Pitch between 2 adacjent perforations" to --Pitch between 2 adjacent perforations--.

In column 11, line 34, change "middle" to --small--; same column, line 35, change "small" (first occurrence) to --middle--.

Signed and Sealed this

Fifth Day of August, 1997

Attest:

BRUCE LEHMAN

*Attesting Officer*  Commissioner of Patents and Trademarks